United States Patent [19]
Yoshioka

[11] 3,796,145
[45] Mar. 12, 1974

[54] OIL RECTIFYING APPARATUS

[76] Inventor: Yoshitomo Yoshioka, 23-23,2-Chome Naka-Ikegami, Ohta, Tokyo, Japan

[22] Filed: Dec. 30, 1971

[21] Appl. No.: 213,868

[30] Foreign Application Priority Data
Feb. 26, 1971   Japan.................................. 46-9587

[52] U.S. Cl. .................................. 99/408, 210/421
[51] Int. Cl. ... A47j 37/12, B01d 33/22, B01d 35/02
[58] Field of Search ..................................... 99/408; 210/418–421

[56] References Cited
UNITED STATES PATENTS
| | | | |
|---|---|---|---|
| 3,648,595 | 3/1972 | Morris | 99/408 X |
| 571,776 | 11/1896 | Long | 210/421 X |
| 1,979,693 | 11/1934 | Lindenberger | 210/418 X |
| 2,658,623 | 11/1953 | Thornhill | 210/418 X |
| 3,210,193 | 10/1965 | Martin | 99/408 X |

*Primary Examiner*—Wayne A. Morse, Jr.
*Attorney, Agent, or Firm*—McGlew and Tuttle

[57] ABSTRACT

A device for treating oil used in potato chip frying apparatus comprises a housing which has a passage for the circulation of the oil therethrough and with a filter extending completely across the passage which has openings for the passage of the oil for circulating it back to the fryer. A rectifying plate is pivotally mounted across the passage and positioned in the oil stream ahead of the filter. The plate defines a means for deflecting the oil immediately ahead of the filter so that the full flow pressure of the oil does not impinge directly against the filter.

1 Claim, 7 Drawing Figures

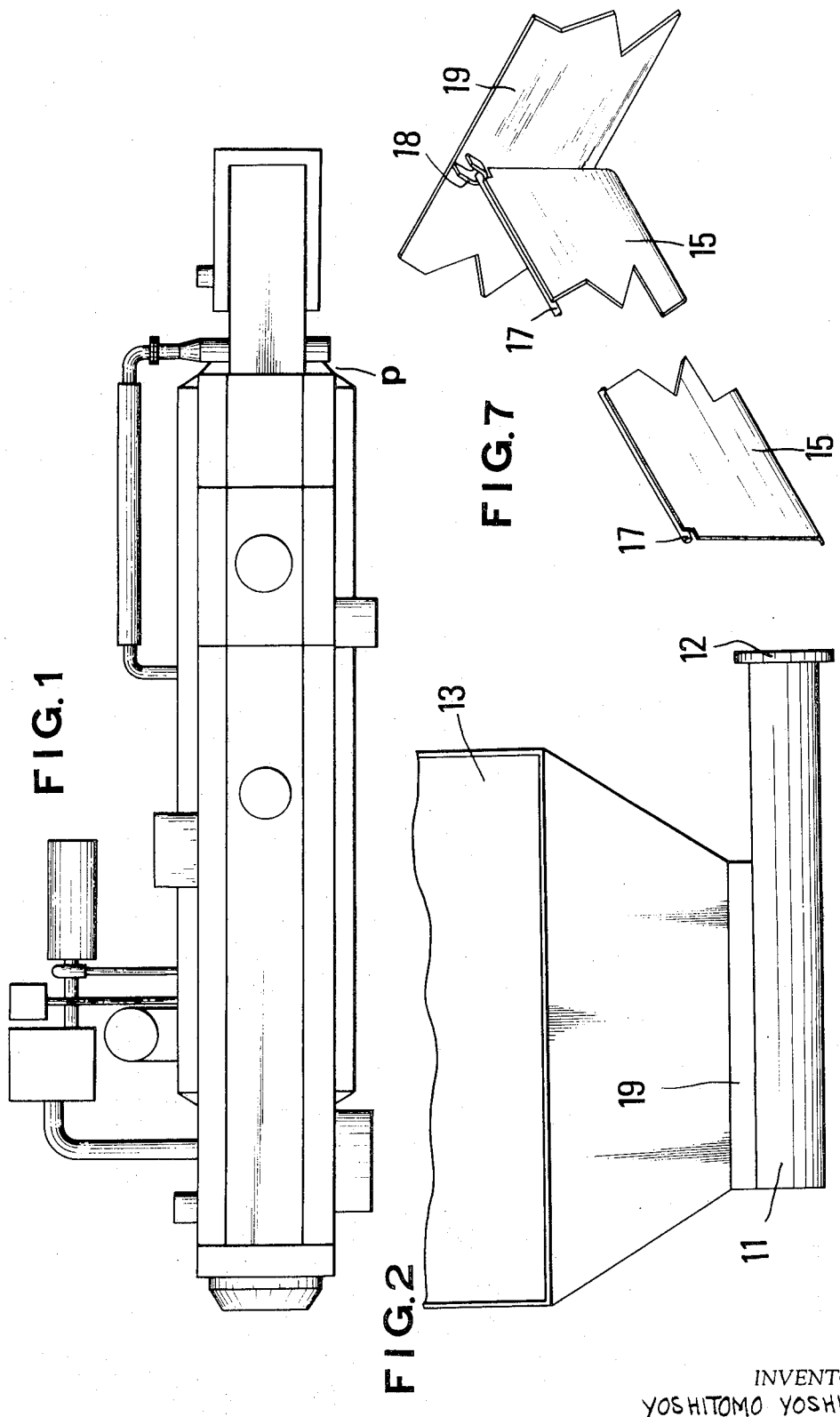

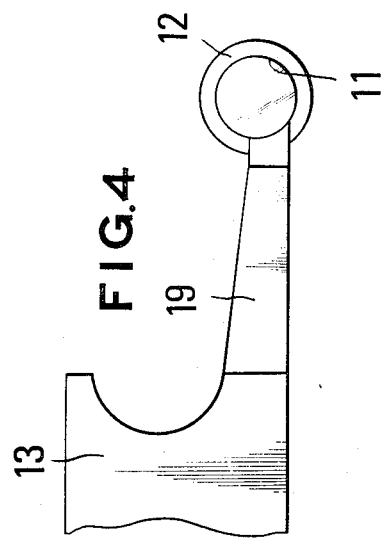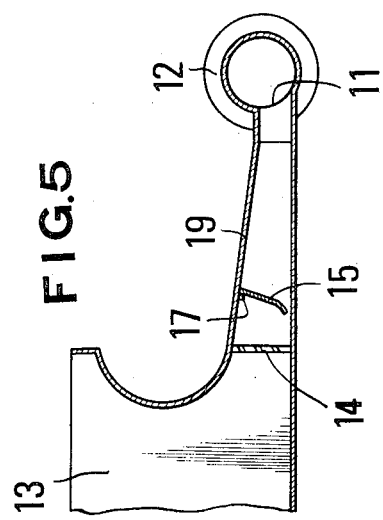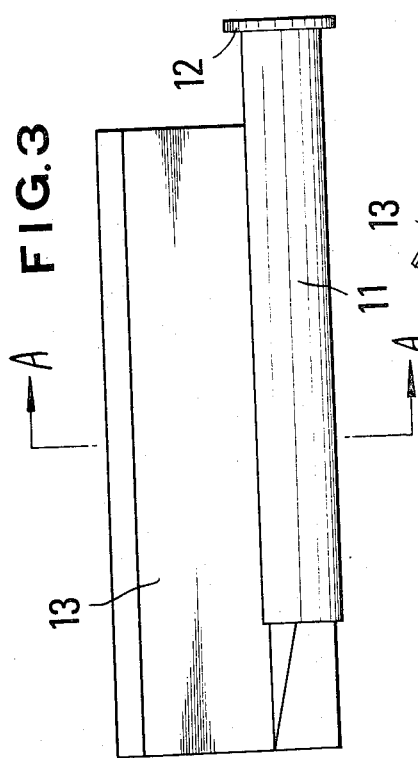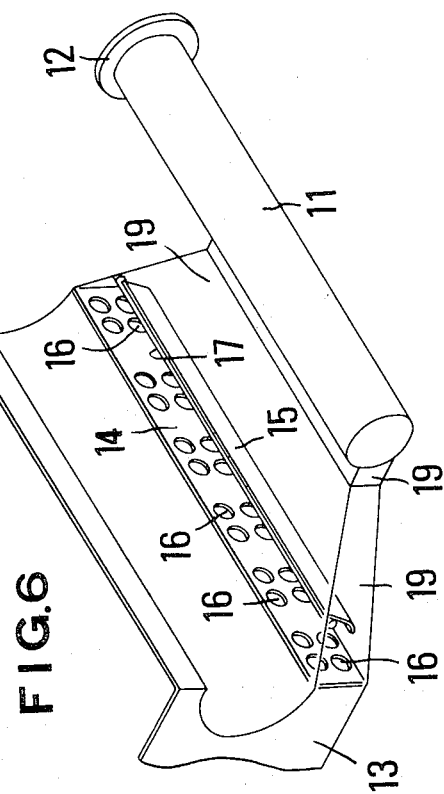

OIL RECTIFYING APPARATUS

BACKGROUND OF THE INVENTION

This invention relates in general to a liquid circulation device, and in particular, to a new and useful method and device for treating, particularly, oil used in potato chip frying devices by circulating it through a filter wherein the circulation passage has a deflection plate which is pivotally mounted directly before the filter.

DESCRIPTION OF THE PRIOR ART

At its present time, it is known to circulate the oil which is used in a deep frying apparatus, such as potato chip frying devices, through a passage which has a filter therein in order to treat the oil prior to its being directed back into the fryer. A disadvantage in the known devices is that the circulation directly in front of the filter becomes poor because of the eddying which occurs with the result that the equipment does not operate satisfactorily.

SUMMARY OF THE INVENTION

It is an object of the present invention to provide an oil rectifier apparatus of simple construction capable of flowing constantly and smoothly the circulating pressured oil supplied to an oil pan through a piping system of a potato chip auto-fryer set, without causing direct collision of the pressured oil against a surface of a filter mounted at an end of an operating casing (i.e., an inlet to the oil pan) which interconnects the piping system with the oil pan.

The present inventionn is, therefore, intended to prevent the occurrence of eddy flow in front of the filter due to direct collision of the pressurized oil against the filter, which could not have been overcome by the prior art system, said intention being accomplished by mounting a rectifying plate at a position close to the filter in the operating casing which interconnects the piping system of the potato chip auto-fryer set with the oil pan, and suppressing and decompressing the pressurized oil supplied from the piping system by means of said rectifying plate, and then directing the slowed-down oil flow to the filter.

Accordingly, it is an object of the invention to provide a device for facilitating the treatment of liquid particularly oil used in a potato chip frying device which comprises a housing defining a flow passage with a filter thereacross through which the oil is passed and with a rectifying plate pivotally mounted directly adjacent the filter in the oil stream so as to deflect the oil immediately ahead of the filter so that it does not immediately impinge directly on the filter.

A further object of the invention is to provide a device for treating liquid such as frying oil which is simple in design, rugged in construction, and economical to manufacture.

The various features of novelty which characterize the invention are pointed out with particularly in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWINGS

The accompanying drawings illustrate a preferred embodiment of the present invention in which;

FIG. 1 is a plan view showing an entire fryer section in a potato chip fryer set, the reference character P in the drawing showing the location of a pressurized oil rectifying apparatus in accordance with the present invention;

FIG. 2 is a plan view of the rectifying apparatus;

FIG. 3 is a front view of the rectifying apparatus;

FIG. 4 is a left side view of the rectifying apparatus;

FIG. 5 is a section view taken on the line A—A in FIG. 3;

FIG. 6 is a perspective view of a principal portion of the rectifying apparatus; and FIG. 7 is a fragmentary, enlarged perspective view of the rectifying apparatus.

DETAILED DESCRIPTION OF THE INVENTION

Referring to the drawings, in particular, the invention embodied therein comprises a frying oil treatment device which comprises a housing or casing 19 which is adapted to be connected in the general vicinity of the part p of a potato chip frying device generally designated 50. The apparatus comprises means for treating, such as by filtering, the frying oil which is circulated through the housing 19 back into an oil pan for operating part of the fryer 50. The housing 19 includes a connecting pipe part 11 having a flange 12 which is attached at the location p for receiving the oil which is used in the oil pan 13 and for circulating it through the passage defined by the housing 19, which, as shown particularly in FIG. 6, widens outwardly up to the location of a filter 14 which extends completely across the passage. The filter 14 is provided with suitably sized openings 16 for the passage of the treated oil back into the oil pan portion 13.

In accordance with the invention, a rectifying or deflecting plate 15 has a top edge which carries a rod 17 which is pivotally mounted at each end in U-shaped bracket members 18 which are secured on a side of the housing 19. The rectifying plate 15 therefore is suspended by the rod so that its lower end which is rounded slightly, extends into the oil flow stream directly ahead of the filter 14. The rectifying plate 15 defines means for deflecting the liquid immediately ahead of the filter so that the full flow pressure of the liquid does not directly impinge against the filter and so that there is no eddying which would interfere with the smooth flow of the treatment oil back into the oil pan 13.

Although the rectifying plate comprising a single plate was illustrated it may include a plurality of such plates.

What is claimed is:

1. A potato chip frying apparatus, comprising a housing having a tubular flow part with a passage for the circulation of the frying oil to be treated therethrough, said housing including a closed rectangular passage connected to said tubular flow part which is outwardly flaring in a downstream direction, a filter extending across the widest protion of said passage and having openings for the passage of oils therethrough, a pivot rod pivotally mounted across said passage adjacent the top thereof and a rectifying plate extending across a major portion of said passage and carried on said rod for pivotal movement therewith and positioned in the oil stream ahead of and directly adjacent said filter and deflecting the oil immediately ahead of said filter so that the full flow pressure of the liquid does not directly impinge against said filter, said plate being pivotal with said rod in the downstream direction by the flow of oil thereby.

* * * * *